United States Patent
McCarty et al.

(10) Patent No.: US 12,501,121 B2
(45) Date of Patent: *Dec. 16, 2025

(54) SYSTEMS AND METHODS FOR LINKING SEGMENTS OF MEDIA GUIDANCE DATA FOR EFFICIENT OPERATION OF MEMORY CONSTRAINED DEVICES

(71) Applicant: Adeia Guides Inc., San Jose, CA (US)

(72) Inventors: Michael McCarty, Agoura Hills, CA (US); Mikhail Aksenfeld, Castaic, CA (US); Vazrik Israelian, Glendale, CA (US); Glen E. Roe, Simi Valley, CA (US); Corey Tulis, Portland, OR (US); David Wittke, Simi Valley, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,638

(22) Filed: Nov. 2, 2023

(65) Prior Publication Data

US 2024/0064390 A1 Feb. 22, 2024

Related U.S. Application Data

(63) Continuation of application No. 17/356,882, filed on Jun. 24, 2021, now Pat. No. 11,843,842, which is a (Continued)

(51) Int. Cl.
*H04N 7/173* (2011.01)
*H04N 21/482* (2011.01)
(Continued)

(52) U.S. Cl.
CPC ....... *H04N 21/858* (2013.01); *H04N 21/4821* (2013.01); *H04N 21/4825* (2013.01); *H04N 21/8133* (2013.01); *H04N 21/8456* (2013.01)

(58) Field of Classification Search
CPC .......... H04N 21/2355; H04N 21/4314; H04N 21/4355; H04N 21/858; H04N 21/4821; (Continued)

(56) References Cited

U.S. PATENT DOCUMENTS 8,510,780 B2 8/2013 Stallings et al.
9,414,101 B1 * 8/2016 Pereira ............... H04N 21/2393
(Continued)

*Primary Examiner* — Gigi L Dubasky
(74) *Attorney, Agent, or Firm* — HALEY GUILIANO LLP

(57) ABSTRACT

Methods and systems for generating segmented media asset identifiers are described herein. The method includes retrieving a first media guidance data segment of a plurality of media guidance data segments. Each segment of the plurality of media guidance data segments includes a plurality of media asset identifiers and is navigationally linked to at least one other media guidance data segment. The method further involves generating for display the media asset identifiers of the first media guidance data segment. While generating for display the media asset identifiers of the first media guidance data segment, a first user input corresponding to navigating to the media asset identifiers of a linked media guidance data segment is received. In response to receiving the first user input, the linked media guidance data segment is retrieved, and the media asset identifiers of the linked media guidance data segment are generated for display.

19 Claims, 6 Drawing Sheets

Related U.S. Application Data continuation of application No. 16/461,698, filed as application No. PCT/US2016/065169 on Dec. 6, 2016, now Pat. No. 11,076,208.

(60) Provisional application No. 62/423,583, filed on Nov. 17, 2016.

(51) Int. Cl.
*H04N 21/81* (2011.01)
*H04N 21/845* (2011.01)
*H04N 21/858* (2011.01)

(58) Field of Classification Search
CPC .......... H04N 21/4825; H04N 21/8133; H04N 21/8456
See application file for complete search history.

(56) References Cited

U.S. PATENT DOCUMENTS

| | | |
|---|---|---|
| 11,076,208 B2 | 7/2021 | Mccarty et al. |
| 2003/0141993 A1 | 7/2003 | Baldwin et al. |
| 2003/0145327 A1 | 7/2003 | Baldwin et al. |
| 2003/0208761 A1 | 11/2003 | Wasserman et al. |
| 2009/0007023 A1 | 1/2009 | Sundstrom |
| 2009/0083794 A1 | 3/2009 | Lee et al. |
| 2010/0306804 A1 | 12/2010 | Mountain |
| 2012/0131615 A1* | 5/2012 | Kobayashi ......... H04N 21/4722 725/40 |
| 2014/0337888 A1 | 11/2014 | Doan et al. |
| 2015/0234820 A1* | 8/2015 | Aravamudan ..... H04N 21/4826 707/769 |
| 2018/0070121 A1 | 3/2018 | Zimmerman et al. |
| 2021/0329353 A1 | 10/2021 | Mccarty et al. |

* cited by examiner

SYSTEMS AND METHODS FOR LINKING SEGMENTS OF MEDIA GUIDANCE DATA FOR EFFICIENT OPERATION OF MEMORY CONSTRAINED DEVICES

CROSS-REFERENCE TO RELATED APPLICATIONS

This application is a continuation of U.S. patent application Ser. No. 17/356,882, filed Jun. 24, 2021, which is a continuation of U.S. patent application Ser. No. 16/461,698, filed May 16, 2019 (now U.S. Pat. No. 11,076,208), which is a national stage application under 35 U.S.C. § 371 of International Application PCT/US2016/065169, filed Dec. 6, 2016, which claims the benefit of U.S. Provisional Application No. 62/423,583, filed November 17, 206, the disclosures of each application are incorporated by reference in their entireties.

BACKGROUND

Given the plethora of media content available to modern television consumers, large data sets of media guidance data (i.e., data that informs users about media that can be consumed) often need to be transmitted to client devices (e.g., set-top boxes) from a content provider. The client device then may present the received media guidance data to a user so that the user can be informed of what media assets are available. In some instances, particularly at times during the day when many users watch television, there are a large number of sessions initiated by client devices with servers of the content provider in order to retrieve media guidance data. Due to the low-bandwidth communication protocol between such systems, downloads of full sets of media guidance data took a significant amount of time. Prior systems dealt with this problem in part through automatic updates stored at the set-top box at low traffic times.

However, with the increase in computing power at content provider servers (e.g., number of nodes), the number of sessions has become less of an issue than many client devices being memory-constrained. For example, many client devices may not be able to receive a full set of media guidance data due to insufficient memory.

SUMMARY

Accordingly, systems and methods are disclosed herein for generating and navigating segmented media asset identifiers. For example, a media guidance application (e.g., executed on a set-top box) requests segments of media guidance data based on user input navigating through media asset listings (e.g., a user scrolling through a grid-guide format or video-on-demand listings). The segments of the media guidance data are linked together based on a relationship to how a user navigates through the segments and are stored at a remote server until requested by the media guidance application. For example, the media guidance application may retrieve one segment at a time, such as a segment containing ten movie titles. The media guidance application may display data from the retrieved segment (e.g., the ten movie titles) and allow a user to navigate through the segment. The segment may contain information (e.g., a pointer) to another segment containing additional movie titles, which can then be retrieved by the media guidance application (e.g., from the remote server) and displayed. For example, if a user navigates up from the first title of the segment or down from the last title of the segment, the media guidance application may retrieve a pointer to another segment from the segment data. In this way, the media guidance application retrieves only media guidance data necessary to generate the current display and can operate efficiently in a memory-constrained environment.

In some aspects, the media guidance application may store a plurality of media guidance data segments. Each segment includes a plurality of media asset identifiers, and each media guidance data segment is navigationally linked to at least one other media guidance data segment. For example, media guidance data may be segmented (e.g., at a media guidance data source) based on the amount of media asset identifiers that fit a display screen. As a specific example, the media guidance data may be segmented such that each segment includes four classification groups of media assets and five media asset identifiers (e.g., a title or box art associated with a media asset) below each classification group (e.g., a genre). Some or all of the segments may be stored locally in memory of a client device (e.g., based on a user commonly requesting those segments) and/or remotely at a media guidance data source (e.g., a remote server). For example, the media guidance application may retrieve and store segments that are linked to a first segment requested by a user from the media guidance data source in order to provide efficient navigation between segments. Once a new segment is requested, the media guidance application may retrieve a new set of segments that are adjacent to the new segment (e.g., a pointer to each of the new set of segments is stored in the new segment).

In some embodiments, the media guidance application may transmit a data packet to a remote server containing display size information. For example, the remote server may store a plurality of media guidance data segmentation mappings which subdivide the media guidance data such that each segment contains an appropriate number of media asset identifiers to fill a display of a given size. Based on the transmitted information in the data packet, the media guidance application may retrieve a segment that fills a display. Alternatively or additionally, the remote server may subdivide the media guidance data based on the information in the transmitted data packet (e.g., its segments are not predetermined but are created custom for each display).

In some embodiments, the media guidance data may be segmented such that a segment contains one or more categories (or classification groups), but the segment does not contain any media asset identifiers within those categories. For example, these classification groups may be generated for display as part of a segment to both fill the screen and inform the user of classification groups other than the classification group that is currently selected and for which media asset identifiers are displayed. In this situation, by the media guidance application not generating for display media asset identifiers in every category, more memory is available for the media guidance application to generate for display media asset identifiers in the currently selected category.

The media guidance application may retrieve a first media guidance data segment of a plurality of media guidance data segments. Each media guidance data segment may include a plurality of media asset identifiers and a plurality of navigational links linking to at least one other media guidance data segment. For example, upon entering a display of media guidance data, the media guidance application may retrieve a first segment to generate for display. The media guidance application may identify the first segment based on a default first segment (e.g., to always present video-on-demand listings for "comedies" upon a user entering a video-on-demand screen) or based on historical user interactions (e.g., the user typically selects video-on-demand programs that are "sports" programs, thus this classification group is part of the first segment). If, for example, the first media guidance data segment is a "comedy" media guidance data segment, the media guidance data segment may include media asset identifiers for multiple comedies (e.g., "Seinfeld," "Frasier," "Big Bang Theory," etc.) and navigational links linking to other media guidance data segments (e.g., an additional media guidance data segment containing media asset identifiers for other comedies; media guidance data segments containing media asset identifiers in other categories, such as "sports" or "drama").

In some embodiments, the media guidance application may receive a second user input selecting a first source. For example, the media guidance application may receive a user input selecting a particular on-demand video channel in a grid-guide. As another example, the media guidance application may receive a user input selecting an over-the-top source (e.g., NETFLIX). The media guidance application then may access an index data structure containing pointers to media asset identifier data structures corresponding to sources. For example, the media guidance application may access the index data structure locally in memory or remotely at a media guidance data source (e.g., via a communication network). The media guidance application may then determine a first media asset identifier data structure corresponding to the first source. For example, based on comparing an identifier of the source selected by the user with identifiers stored in the index data structure, the media guidance application may determine a pointer to a media asset identifier data structure for the source. The data structure may contain a map of the segments (e.g., how they are linked together when a user navigates between them) for media asset data pertaining to the source in addition to the segments themselves. The media guidance application may then retrieve the first data segment from the first media asset identifier data structure. For example, the media guidance application may determine a first segment to retrieve based on data in the media asset identifier data structure and retrieve the segment.

The media guidance application may generate for display the media asset identifiers of the first media guidance segment. For example, upon retrieving the first segment, the media guidance application may generate the media asset identifiers (e.g., titles) in the segment for display such that a user can navigate the media asset identifiers (e.g., titles) of the first segment.

In some embodiments, the media guidance application determines a subset of media guidance data segments linked to the first media guidance data segment. For example, the first segment may have an identifier "000x01" and contain pointers to segments with identifiers "001x01" and "000x02" based respectively on a user request to move to a classification group to the right of the first segment or to a media asset identifier below the last media asset identifier contained on the segment. The media guidance application may then retrieve the subset of media guidance data segments. For example, the media guidance application may, if the segments have not been retrieved and stored locally already, transmit a request to the media guidance data source for the segments based on their identifiers.

The media guidance application, while generating for display the media asset identifiers of the first media guidance data segment, may receive a first user input corresponding to a navigation direction for navigating to a media asset identifier that is not generated for display. For example, the media guidance application may receive a variety of user inputs, such as to navigate between classification groups of media assets, navigate inside a classification group to a media asset identifier in a different media guidance data segment, or navigate to a new classification group based on a two-level hierarchical structure (e.g., a media asset identifier identifies a series, and selection by a user triggers the media guidance application to follow a pointer to another segment containing episodes of the series). Each of these user inputs may correspond to a different navigational direction, e.g., up, down, left, right, select, back, etc. In order to determine whether a new segment should be displayed, the media guidance application may determine, from data in the first segment, identifiers of segments, or pointers to locations in memory of segments, associated with a particular user command. For example, the media guidance application may determine that selection of a particular media asset listing corresponds to a request for episodes of a series and will retrieve the appropriate segment containing the episodes to generate for display to the user.

In some embodiments, receiving the first user input corresponding to a navigation direction for navigating to a media asset identifier that is not generated for display involves determining that the first user input corresponds to a request for data outside a boundary of the first media guidance data segment. For example, the media guidance application may currently be generating for display ten media asset identifiers. The media guidance application may highlight one of the media asset identifiers and may allow the user to move the highlight to select different media asset identifiers. If the user has navigated to the first of the ten media asset identifiers and the media guidance application receives a user input of the "UP" command (e.g., via a user input interface such as a remote control), then the media guidance application may determine that the request corresponds to a request for a media asset identifier that is outside the bounds of the currently displayed segment. For example, the media guidance application may access a data structure defining commands that, when received while a particular media asset identifier is selected, correspond to a request for a new segment. The data structure may be stored with data defining the structure of media asset identifiers in the segment (e.g., their order when presented to a user) and may be arranged as a table where each entry is for a media asset identifier and contains field(s) defining commands that may be received that result in a need for the media guidance application to retrieve another segment. As a specific example, an entry for the first media asset identifier may contain a field that identifies the "UP" command as a command that results in a request for a new segment.

The media guidance application may then determine, based on an identifier contained in the first media guidance data segment, a second media guidance data segment that contains the data outside the boundary of the first media guidance segment. For example, the first media guidance data segment may contain an identifier (e.g., "000x01") or a pointer to a segment that is linked to the first segment based on this command (e.g., the segment identified by "000x01" contains media assets above the current segment on an ordered list, as described further below). The media guidance application may determine the appropriate identifier or pointer from a field in the entry of the data structure defining commands described above. For example, an entry for the first media asset identifier may contain fields indicating commands that result in a request for a new segment as well as the identifiers of segments that should be retrieved in response to receiving the particular command. In some embodiments, by instantiating a pointer to memory containing a particular segment into the data structure (as opposed to a null entry), the media guidance application can both determine that a command resulting in a request for a new segment has been received and determine the segment that needs to be retrieved.

The media guidance application may determine which navigational link of the plurality of navigational links of the first media guidance data segment to read based on the navigation direction of the first user input, and each navigational link corresponds to a different navigation direction. For example, if the media guidance application receives a first user input of "DOWN" (e.g., a key press of a DOWN arrow on a remote control), the media guidance application may determine to read the DOWN navigational link in the media guidance data segment based on this user input. For example, if the media guidance application is displaying a first set of comedy titles, and the user wishes to view one or more additional comedy titles, the viewer may press the DOWN arrow to view additional comedy titles that the media guidance application is not presently displaying.

In some embodiments, determining which navigational link to read involves comparing, for each of the plurality of navigational links, the navigation direction of the first user input to a direction associated with the navigational link, and selecting the navigational link with the associated direction that matches the navigation direction of the first user input. For example, if the first media guidance data segment includes navigational links "UP," "DOWN," "LEFT," and "RIGHT," the media guidance application may compare the navigation direction of the first user input to the directions associated with each navigational link. For example, if the navigation direction of the first user input is "DOWN," the media guidance application compares this direction with the directions associated with the "UP," "DOWN," "LEFT," and "RIGHT" navigational links to select the navigational link associated with the direction "DOWN," which matches the navigation direction of the first user input.

The media guidance application may read the contents of the navigational link corresponding to the navigation direction of the first user input. For example, if the navigation direction is "DOWN", the media guidance application may read the contents of the DOWN navigational link in the media guidance data segment. The contents of the DOWN navigational link may be, for example, a pointer to a second media guidance data segment or an identifier of a second media guidance data segment containing an additional comedy title.

The media guidance application may determine, based on the contents of the navigational link corresponding to the navigation direction of the first user input, a second media guidance data segment for retrieval. The second media guidance data segment includes the media asset identifier that is not generated for display. For example, the media guidance application may determine, based on the contents of the DOWN navigational link (e.g., a pointer to a media guidance data segment), to retrieve the second media guidance data segment at the location given by the pointer. This second media guidance data segment includes the media asset identifier (in this example, the additional comedy title) that is not generated for display.

In some embodiments, the media asset identifiers of the first media guidance data segment and the second media guidance data segment are arranged in an ordered list. In such embodiments, the second media guidance data segment may contain media asset identifiers on the ordered list immediately above a first media asset identifier of the first media guidance data segment. For example, the media guidance application may receive a user input of "UP" using a remote control, and the second media guidance data segment contains media asset identifiers that are ordered above the first media guidance data segment (e.g., in the same classification group or category). As a specific example, the ordered list may be based on alphabetical order, such that a media guidance application generating for display media asset identifiers starting with the letter "H" in a "sports" category may, upon receiving an input of "UP" and the new segment being retrieved, generate for display media asset identifiers starting with the letter "G." Analogously, the second media guidance data segment may contain media asset identifiers on the ordered list immediately below a last media asset identifier of the first media guidance data segment. For example, the media guidance application may receive a user input of "DOWN" using a remote control, and the second media guidance data segment contains media asset identifiers that are ordered below the first media guidance data segment (e.g., in the same classification group or category). As a specific example, the ordered list may be based on alphabetical order, such that a media guidance application generating for display media asset identifiers starting with the letter "G" in a "sports" category may, upon receiving an input of "DOWN" and the new segment being retrieved, generate for display media asset identifiers starting with the letter "H."

As another example, the second media guidance data segment may contain an initial media asset identifier on the ordered list if the first media guidance data segment contains a last media asset identifier on the ordered list. For example, if no further segments are below the currently displayed segment (e.g., media asset identifiers starting with the letter "Z" if ordered alphabetically), the media guidance application may, in response to a received user input of "DOWN," retrieve a segment corresponding to the first segment of the classification group or category (e.g., media asset identifiers starting with the letter "A" if ordered alphabetically). As yet another example, the second media guidance data segment may contain the last media asset identifier on the ordered list if the first media guidance data segment contains the initial media asset identifier on the ordered list. For example, if no further segments are above the currently displayed segment (e.g., media asset identifiers starting with the letter "A" if ordered alphabetically), the media guidance application, in response to a received user input of "UP," may retrieve a segment corresponding to the last segment of the classification group (e.g., media asset identifiers starting with the letter "Z" if ordered alphabetically).

As another example, the second media guidance data segment may contain a subcategory of media asset identifiers related to a media asset identifier of the first media guidance data segment. As described above, the media guidance application may receive a user selection of a media asset identifier for a series and retrieve a segment containing media asset identifiers of episodes (e.g., the subcategory) of the series. The media guidance data segment may include, for each media asset identifier for which a subcategory is available, a pointer or segment identifier for identifying or navigating to the media guidance data segment of the subcategory. A media guidance data segment for a subcategory may be linked to additional media guidance data segments for, e.g., additional media asset identifiers within the subcategory (e.g., additional episodes) or media asset identifiers associated with different subcategories.

In some embodiments, the first media guidance data segment corresponds to a first category. For example, the first media guidance data segment may correspond to the category "comedy." In some embodiments, the media guidance application may retrieve a third segment of media guidance data comprising a plurality of categories of media assets and generate for display the categories of media assets of the third segment of media guidance data. For example, the media guidance application may retrieve a third segment of media guidance data that includes other categories, such as "drama," "sports," and "movies," and generate for display these additional categories. The media guidance application may display the categories so that a user may navigate to a different category, in which case the media guidance application would retrieve a media guidance data segment containing media asset identifiers within the selected category. In other embodiments, the first media guidance data segment may contain one or more additional categories, without including media asset identifiers within these additional categories. In such embodiments, the media guidance application may display the additional categories without media asset identifiers, and the additional categories can be selected by a user to cause the media guidance application to retrieve a media guidance data segment corresponding to the selected category.

In some embodiments, the first media guidance data segment corresponds to a first category, and the second media guidance data segment corresponds to a second category. For example, the first media guidance data segment may correspond to the "comedy" category, and the second media guidance data segment may correspond to the "drama" category. In response to the first user input, the media guidance application has displayed media asset identifiers in the "drama" category. The media guidance application, while generating for display the media asset identifiers of the second media guidance data segment, may receive a second user input corresponding to a navigation direction for navigating to a media asset identifier in the first category. For example, the media guidance application may receive a user input of "LEFT" or "RIGHT" (e.g., via a user input interface such as a remote control), which may correspond to retrieving a new segment containing media asset identifiers in the category to the left or right of the currently selected classification group. For example, in situations where the media guidance application displays media asset identifiers of only one of the classification groups or categories at a time, the media guidance application may retrieve a segment (e.g., based on a segment identifier or pointer, as described above) with media asset identifiers for the category to the left or right of the previously selected classification group. In such embodiments, when navigating away from a category, the media guidance application stores an indication of which segment was last generated for display. When returning to the first category, the media guidance application may generate for display the media asset identifiers of the first media guidance data segment, i.e., the media guidance data segment that the user had previously navigated away from. For example, if the media guidance application receives a series of user selections from "comedy" to "drama" and back to "comedy," instead of generating the first segment of media asset identifiers for "comedy," the media guidance application may generate the segment that was last generated for display.

In some embodiments, prior to receiving the first user input for navigating to the media asset identifiers of the second media guidance data segment, the media guidance application visually distinguishes a first media asset identifier of the first media guidance data segment. For example, if the first media guidance data segment contains comedies, the media guidance application may highlight the media asset identifier for "Frasier." After receiving the second user input for navigating to the media asset identifiers of the first category, the media guidance application may visually distinguish the first media asset identifier of the first media guidance data segment. For example, if the media guidance application navigates to the "drama" category and then returns back to the "comedy" category, the media guidance application may again highlight "Frasier," so that the user may continue navigating from the same media asset identifier that he left off on in the comedy category. To implement this, the media guidance application may store in memory data indicating that "Frasier" had been highlighted in the comedy category when the user had navigated away.

In some embodiments, multiple sets of media guidance data segments are available for retrieval, and each set of media guidance data segments includes media guidance data segments of a different size. For example, a first set of media guidance data segments may include media guidance data segments, each containing eight media asset identifiers, and a second set of media guidance data segments may include media guidance data segments, each containing 10 media asset identifiers. The media guidance application may select a set of media guidance data segments for retrieval based on a display characteristic. Display characteristics may include, for example, screen size, resolution, or other display settings. Display characteristics may also include an amount of available space on a display for displaying media asset identifiers; for example, at some times, only a portion of a screen may be used for displaying media asset identifiers (e.g., if the media guidance application is concurrently displaying media), and at other times, the full screen may be available for displaying media asset identifiers. The amount of available space may be based on the media guidance data segment displayed; for example, one media guidance data segment may be displayed on the full screen, and another media guidance data segment may only be displayed on a part of a screen, e.g., if an advertisement, or a preview or other media, is concurrently displayed with the segment. Based on the relevant display characteristic(s), the media guidance application may retrieve data describing the different available sets of media guidance data segments, select one of the sets, and retrieve only media guidance data segments from the selected set.

The media guidance application may retrieve the second media guidance data segment. For example, as described above, the media guidance application may retrieve the second media guidance data segment by transmitting a request for the segment to a media guidance data source (e.g., a remote server) or retrieve the linked segment from memory if it has already been received. The media guidance application may then generate for display the media asset identifiers of the second media guidance data segment. For example, the media guidance application may generate for display the media asset identifiers (e.g., titles) contained in the linked segment. In some embodiments, as described above, the media guidance application may retrieve media guidance data segments identified in the linked segment (e.g., by segment identifiers) for more efficient navigation between segments.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
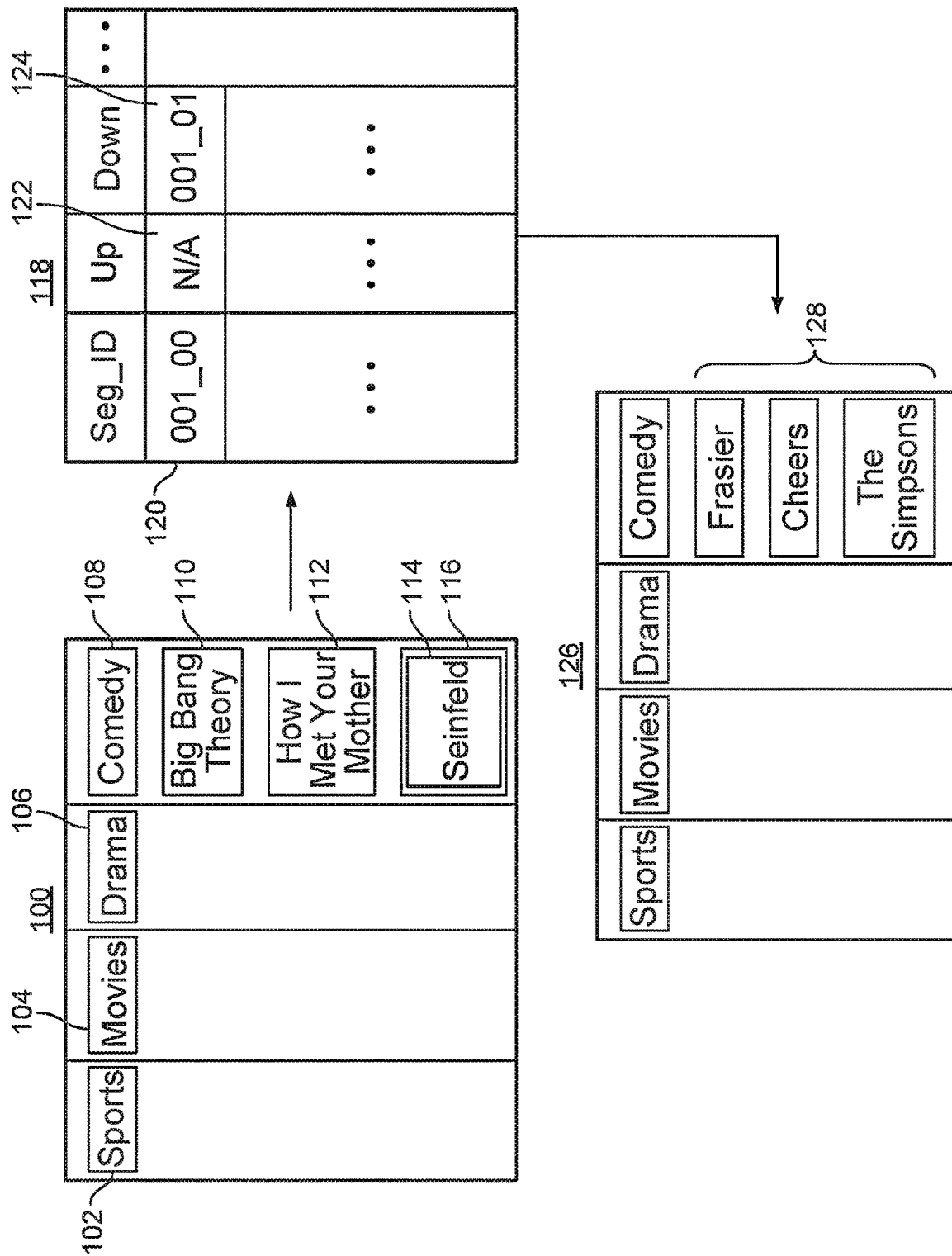
FIG. 1 shows an illustrative example of navigation between segmented media guidance data, in accordance with some embodiments of the disclosure.

Systems and methods are disclosed herein for generating and navigating segmented media asset identifiers. For example, a media guidance application (e.g., executed on a set-top box) requests segments of media guidance data based on user input navigating through media asset listings (e.g., a user scrolling through a grid-guide format or video-on-demand listings). The segments of the media guidance data are linked together based on a relationship to how a user navigates through the segments and are stored at a remote server until requested by the media guidance application. For example, the media guidance application may retrieve one segment at a time, such as a segment containing ten movie titles. The media guidance application may display data from the retrieved segment (e.g., the ten movie titles) and allow a user to navigate through the segment. The segment may contain information (e.g., a pointer) to another segment containing additional movie titles, which can then be retrieved by the media guidance application (e.g., from the remote server) and displayed. For example, if a user navigates up from the first title of the segment or down from the last title of the segment, the media guidance application may retrieve a pointer to another segment from the segment data. In this way, the media guidance application retrieves only media guidance data necessary to generate the current display and can operate efficiently in a memory-constrained environment.

A method to randomly access data within a massive On Demand set of service data is disclosed. The use of a linkage between segments was created that extended beyond simple up/down/left/right navigation. This typical navigation scheme can be expanded to provide a way to allow navigation within a segmented data set as well provide a mechanism for media guidance application to retrieve and display the data requested by a user. In some embodiments, each data segment contains up to six different linkages to related segments. For example, the linkages for a selected title or displayed data segment may be defined as follows:

UP Segment: contains the titles displayed above a currently selected title cursor, or above a presently displayed data segment;

DOWN Segment: contains the titles displayed below a currently selected title cursor, or below a presently displayed data segment;

LEFT Segment: contains the starting titles (default) in a display of a category when navigating left, or a data segment to the left of a presently displayed data segment;

RIGHT Segment: contains the starting titles (default) in a display of a category when navigating right, or a data segment to the right of a presently displayed data segment;

TOP_CAT Segment: contains titles in a display of the top of a category;

BOT_CAT Segment: contains titles in a display of the bottom (default starting titles) of a category; and SUPER_CAT Segment: contains the segment for a Supercategory child segment.

As displayed titles are navigated up or down, the UP/DOWN segment links are used to retrieve additional data. These links do not create a wrap around for the data. At some point an UP or DOWN link may not exist, which indicates the limit of that direction (top or bottom of a category). At this point, the navigation logic of the media guidance application reads the TOP_CAT or BOT_CAT links to identify the media guidance data segment on the opposite side of the category. When an On Demand channel has been configured as a Supercategory (e.g., a channel that includes multiple categories, each containing one or more media asset), then its Local Segment will contain, for every super category, a SUPER_CAT link to the segment that contains the next level of super category data. When in the middle of a set of titles within a category, the above-described links allow a user to navigate the segmented data in a way that follows the user's behavior during navigation.

Given a large legacy set-top population there exists a need to expand a catalog of on demand programming for those set-tops. Traditionally, a set of titles and categories would fit within the RAM of a set-top and could be easily transmitted over the RF network as a single block of data. For many of these set-tops there exists a restrictive memory constraint and an IP (2way) network that cannot handle the bandwidth needs to supply the catalog over that network. Given such restraints, a method of dividing up the On Demand catalog has been devised and implemented that focuses on how the data is displayed on the set-top. Typically, there are various categories containing many titles. The user is able to navigate the titles and the categories. This method allows this to happen in a seamless way without the need for the set-top to know everything about an On Demand service. Each loaded segment will contain at a minimum just the amount of data necessary to fill the screen with navigation information.

In some embodiments, data for a given On Demand service is segmented in such a way as to facilitate navigation of its content. The segments may be referred to as Global Segment, Local Segments, and Spillover Segments. The Global Segment provides a 1:1 mapping from each On Demand Service, identified by Service ID, to its corresponding Local Segment, identified by carousel ID and file ID. The Global Segment is used by a set-top box when it tunes to a Service to load its Local Segment. With the exception of a Supercategory channel, a Service's Local Segment contains its content (e.g., media asset identifiers or titles). Once a Local Segment that is being built contains a predefined maximum number of titles, any additional ones for the service will be placed in a Spillover Segment, which is then subject to the same Spillover Segment creation rule for its titles, and so on. In contrast, the Local Segment for a Supercategory channel contains a link for each of its Supercategories' "next level" segments. The latter segment is structurally identical to the Local Segment and Spillover Segments explained above, and is also subject to the same Spillover Segment creation rule. The number of titles contained within a segment is configurable by the server and may be variable based on algorithms that determine the best use of carousel bandwidth such as the creation of less segments and client display requirements to minimize the number of segment reads to display information and to minimize carousel file access times.

FIG. 1 shows an illustrative example of navigation between segmented media guidance data, in accordance with some embodiments of the disclosure. For example, display 100 and display 126 may be presenting a media guidance application used by a user to navigate media asset identifiers (e.g., listings), as described further below with respect to FIGS. 2-3. Display 100 and display 126 may appear on one or more user devices (e.g., any of the devices listed in FIGS. 4-5 below). Moreover, the media guidance application may use the process described in FIG. 6 below to generate display 100, display 126, or any of the features described therein.

Display 100 includes classification groups 102, 104, 106, and 108. Classifications groups 102, 104, and 106 do not have any media asset identifiers loaded and serve to fill the screen and inform a user of additional categories while minimizing memory requirements for classification groups that are not currently selected. Classification group 108 is currently selected and a user is scrolling among media asset identifiers (e.g., identifiers 110, 112, and 114). Media asset identifier 114 is visually distinguished (e.g., by highlighting 116), representing that the user has navigated to media asset identifier 114. The media guidance application may retrieve the classification groups and media asset identifiers displayed on display 100 as a first segment, as described below. In response to receiving a user input (e.g., the "DOWN", "UP", "RIGHT", "LEFT", or "SELECT" command on a remote control), the media guidance application determines a linked segment to load based on the command.

As referred to herein, a "segment" should be understood as a subset of media guidance data. In some embodiments, segments may be navigationally linked. For example, one segment may contain pointers to segments that should be retrieved as a result of particular user commands and boundary conditions, as described further below (e.g., an "UP" command received while the first, or highest, media asset identifier of a segment is selected (or highlighted) causes the media guidance application to retrieve and display a particular second segment). In some embodiments, the segment contains a particular amount of media guidance data to fill a display portion dedicated to displaying the data of the segment. For example, different quantities of media guidance information may be provided in individual segments for different size displays.

Table 118 contains identifiers of segments that are linked to a particular segment. For example, table 118 contains an entry for segment identifier 120 (e.g., "001_00"). Segment identifier 120 may identify the segment shown in display 100, i.e., the segment that includes media asset identifiers 110, 112, and 114 for the comedies "Big Bang Theory," "How I Met Your Mother," and "Seinfeld," respectively. Table 118 may be integrated into the data of the first segment (e.g., included with data defining the media asset identifiers contained in the first segment, pointers to images associated with the media asset identifiers in the segment, etc.) or may be a separate segment index data structure that may be transmitted to the media guidance application by a remote server upon initiating a session. For example, the remote server may translate the segment index data structure (e.g., table 118) such that the media guidance application can request particular segments based on received user commands more efficiently.

When a user navigates outside of the bounds of the displayed media asset identifiers in a segment (e.g., the media guidance application receives a "DOWN" command while the last, or bottom, media asset identifier of the segment is highlighted or otherwise selected), the media guidance application determines which segment to load based on table 118. Continuing the example of receiving a "DOWN" command, the media guidance application would determine, because segment identifier 114 (the last segment identifier in displayed segment 120) is the last media asset identifier in its segment, to retrieve segment identifier 124 (e.g., "001_01"). Segment identifier 124 may be a pointer to a particular location in memory where a segment is stored, or an identifier that can be used to quickly determine in a data structure containing segments the correct segment to retrieve (e.g., from a remote server). A plurality of other segment navigational linkage possibilities are contained in table 118 (e.g., if a user presses an "UP" command, then segment identifier 122 is the linked segment), as described further below. For some navigational linkages, a segment may not be linked. For example, for the last segment in a category, the "DOWN" entry in table 118 may be N/A because there are no further segments below the segment. In some embodiments, table 118 may be self-referential, where each field for a given segment identifier contains a pointer to an entry for another segment identifier to provide more efficient look-up of the segments that will be adjacent to the newly retrieved segment.

As referred to herein, a first segment "adjacent to" a second segment should be understood as a first segment that contains media guidance data that was contiguous with media guidance data of the second segment prior to the data being divided to form segments, or that would be contiguous with media guidance data of the second segment if the data were de-segmented. In some embodiments, the media guidance data may be media asset identifiers. For example, the identifiers may be ordered alphabetically and divided such that one segment contains media asset identifiers starting with "A-E," the next contains identifiers starting with "F-G," and the next contains "H-Z." The segments containing the identifiers starting with "A-E" and "F-G" are adjacent in that the two segments contain contiguous data. However, the "A-E" and "H-Z" segments were not contiguous prior to division into segments, and thus are not adjacent, because there was data in between the two segments prior to division (e.g., the "F-G" media asset identifiers). In another example, the identifiers of the classification groups "Comedy" and "Drama" may be considered adjacent to each other, if these categories are displayed next to each other, as shown in display 100. In some embodiments, two adjacent segments may be linked where a navigation command from one segment causes the media guidance application to retrieve the other segment (e.g., the adjacent segment). This allows the media guidance application to provide the ordered media guidance data (e.g., in the correct alphabetical order, or from one category to an adjacent category) without having to receive and store the entire data set. As a specific example, any of the commands (e.g., "UP," "DOWN," etc.) discussed below that correspond to a request for a new segment (e.g., based on boundary conditions of the current segment, as described below) may be considered a navigation command, and the requested segment may be understood as an adjacent segment.

Display 126 shows the result of the media guidance application receiving a particular command (e.g., a "DOWN" command) from a user and then retrieving and displaying a new segment. New media asset identifiers 128 have replaced media asset identifiers 110, 112, and 114 as a result of the media guidance application retrieving and displaying the new segment. In this particular example, the command resulted in navigation inside a classification group (e.g., classification group 108) and classification groups 102, 104, and 106 are still displayed, but no media asset identifiers within these classification groups are displayed.

The media guidance application may store a plurality of media guidance data segments, and each segment includes a plurality of media asset identifiers. Furthermore, each media guidance data segment is navigationally linked to at least one other media guidance data segment. For example, media guidance data may be segmented (e.g., at a media guidance data source) based on the amount of media asset identifiers (e.g., media asset identifiers 110, 112, and 114) that fit a display screen. As a specific example, the media guidance data may be segmented such that each segment includes four classification groups of media assets (e.g., classification groups 102, 104, 106, and 108) and three media asset identifiers (e.g., media asset identifiers 110, 112, and 114) below one or more classification groups (e.g., classification groups 102, 104, 106, and 108). Some or all of the segments may be stored locally in memory of a client device (e.g., based on a user commonly requesting those segments) and/or remotely at a media guidance data source (e.g., a remote server). For example, the media guidance application may retrieve and store segments that are linked (e.g., as defined in table 118) to a first segment (e.g., segment identifier 120) requested by a user from the media guidance data source in order to provide efficient navigation between segments. Once a new segment is requested, the media guidance application may retrieve a new set of segments (e.g., based on identifiers contained in table 118) that are adjacent to the new segment (e.g., a pointer to each of the new set of segments is stored in the new segment).

In some embodiments, the media guidance application may transmit a data packet to a remote server containing display size information. For example, the remote server may store a plurality of media guidance data segmentation mappings that subdivide the media guidance data such that each segment contains an appropriate number of media asset identifiers to fill a display of a given size. Based on the transmitted information in the data packet, the media guidance application may retrieve a segment that fills a display. Alternatively or additionally, the remote server may subdivide the media guidance data based on the information in the transmitted data packet (e.g., its segments are not predetermined but are created custom for each display).

In some embodiments, the media guidance data may be segmented such that a segment contains information identifying one or more categories (or classification groups), but the segment does not contain any media asset identifiers within those categories. For example, these classification groups (e.g., classification groups 102, 104, and 106) may be generated for display as part of a segment to both fill the screen and inform the user of classification groups other than the classification group that is currently selected and for which media asset identifiers are displayed (e.g., classification group 108). In this situation, by the media guidance application not generating for display media asset identifiers in every category, more memory is available for the media guidance application to generate for display media asset identifiers in the currently selected category.

The media guidance application may retrieve a first media guidance data segment of a plurality of media guidance data segments. Each media guidance data segment may include a plurality of media asset identifiers (e.g., media asset identifiers 110, 112, and 114) and a plurality of navigational links linking to at least one other media guidance data segment (e.g., segment identifiers 122 and 124). For example, upon entering a display of media guidance data (e.g., display 100 or display 126), the media guidance application may retrieve a first segment to generate for display. The media guidance application may identify the first segment based on a default first segment (e.g., to always present video-on-demand listings for "comedies" upon a user entering a video-on-demand screen) or based on historical user interactions (e.g., the user typically selects video-on-demand programs that are "sports" programs, thus this classification group is part of the first segment). If, for example, the first media guidance data segment is a "comedy" media guidance data segment, the media guidance data segment may include media asset identifiers for multiple comedies (e.g., media asset identifiers 110, 112, and 114 for "Seinfeld," "Frasier," and "Big Bang Theory") and navigational links linking to other media guidance data segments (e.g., an additional media guidance data segment containing media asset identifiers for other comedies; media guidance data segments containing media asset identifiers in other categories, such as "sports" or "drama").

In some embodiments, the media guidance application may receive a second user input selecting a first source. For example, the media guidance application may receive a user input selecting a particular on-demand video channel (e.g., HBO On-Demand, Sports On Demand, Free Movies, etc.) in a grid-guide. As another example, the media guidance application may receive a user input selecting an over-the-top source (e.g., NETFLIX). The media guidance application then may access an index data structure containing pointers to media asset identifier data structures corresponding to sources. For example, the media guidance application may access the index data structure locally in memory or remotely at a media guidance data source (e.g., via a communication network). The media guidance application may then determine a first media asset identifier data structure corresponding to the first source. For example, based on comparing an identifier of the source selected by the user with identifiers stored in the index data structure, the media guidance application may determine a pointer to a media asset identifier data structure for the source. The data structure may contain a map of the segments (e.g., table 118) for media asset data pertaining to the source in addition to the segments themselves. The media guidance application may then retrieve the first data segment from the first media asset identifier data structure. For example, the media guidance application may determine a first segment to retrieve based on data in the media asset identifier data structure and retrieve the segment (e.g., retrieving the segment with segment identifier 120).

The media guidance application may generate for display the media asset identifiers of the first media guidance segment. For example, upon retrieving the first segment, the media guidance application may generate the media asset identifiers (e.g., media asset identifiers 110, 112, and 114) in the segment for display such that a user can navigate the media asset identifiers (e.g., titles "Seinfeld," "Frasier," and "Big Bang Theory") of the first segment (e.g., within display 100). In some embodiments, the media guidance application determines a subset of media guidance data segments linked to the first media guidance data segment (e.g., as defined in table 118). For example, the first segment may have an identifier "000x01" and contain pointers to segments with identifiers "001x01" and "000x02" based respectively on a user request to move to a classification group to the right of the first segment or to a media asset identifier below the last media asset identifier contained on the segment. The media guidance application may then retrieve the subset of media guidance data segments. For example, the media guidance application may, if they have not been retrieved and stored locally already, transmit a request to the media guidance data source for the segments based on their identifiers (e.g., segment identifier 120).

The media guidance application, while generating for display the media asset identifiers of the first media guidance data segment, may receive a first user input corresponding to a navigation direction for navigating to a media asset identifier that is not generated for display. For example, the media guidance application may receive a variety of user inputs, such as to navigate between classification groups of media assets, navigate inside a classification group to a media asset identifier in a different media guidance data segment, or navigate to a new classification group based on a two-level hierarchical structure (e.g., a media asset identifier identifies a series, and selection by a user triggers the media guidance application to follow a pointer to another segment containing episodes of the series). Each of these user inputs may correspond to a different navigational direction, e.g., up, down, left, right, select, back, etc. In order to determine a new segment should be displayed, the media guidance application may determine from data in the first segment identifiers of segments, or pointers to locations in memory of segments, associated with a particular user command (e.g., stored in a table such as table 118). For example, the media guidance application may determine that selection of a particular media asset listing corresponds to a request for episodes of a series and will retrieve the appropriate segment containing the episodes to generate for display to the user (e.g., based on determining a segment identifier in table 118 such as segment identifier 120). Alternatively or additionally, the data structure (e.g., table 118) containing the navigational linkage information related to segments may be stored in memory or remotely at a server.

In some embodiments, receiving the first user input corresponding to a navigation direction for navigating to a media asset identifier that is not generated for display involves determining that the first user input corresponds to a request for data outside a boundary of the first media guidance data segment. For example, the media guidance application may currently be generating for display three media asset identifiers (e.g., media asset identifiers 110, 112, and 114). The media guidance application may highlight one of the media asset identifiers and may allow the user to move the highlight to select different media asset identifiers. If the user has navigated to the last media asset identifier (e.g., media asset identifier 114 as indicated by highlighting 116) and the media guidance application receives a user input of the "DOWN" command (e.g., via a user input interface such as a remote control), then the media guidance application may determine that the request corresponds to a request for a media asset identifier that is outside the bounds of the currently displayed segment. The media guidance application may then determine, based on an identifier contained in the first media guidance data segment, a second media guidance data segment that contains the data outside the boundary of the first media guidance segment. For example, the first media guidance data segment (e.g., identified by segment identifier 120) may contain an identifier (e.g., segment identifier 124) or a pointer to a segment that is linked to the first segment based on this command (e.g., the segment identified by identifier 124 contains media assets below the current segment on an ordered list, as described above).

The media guidance application may then determine, based on an identifier contained in the first media guidance data segment, a second media guidance data segment that contains the data outside the boundary of the first media guidance segment. For example, the first media guidance data segment may contain an identifier (e.g., "000x01" in table 118) or a pointer to a segment that is linked to the first segment based on this command (e.g., the segment identified by "000x01" contains media assets above the current segment on an ordered list, as described further below). The media guidance application may determine the appropriate identifier or pointer from a field in the entry of the data structure defining commands described above. For example, an entry for the first media asset identifier may contain fields indicating commands (e.g., "UP," "DOWN," etc.) that result in a request for a new segment as well as the identifiers of segments that should be retrieved in response to receiving the particular command. In some embodiments, by instantiating a pointer to memory containing a particular segment into the data structure (as opposed to a null entry), the media guidance application can both determine that a command resulting in a request for a new segment has been received and determine the segment that needs to be retrieved.

The media guidance application may determine which navigational link of the plurality of navigational links of the first media guidance data segment to read based on the navigation direction of the first user input, and each navigational link corresponds to a different navigation direction. For example, if the media guidance application receives a first user input of "DOWN" (e.g., a key press of a DOWN arrow on a remote control), the media guidance application may determine to read the DOWN navigational link in the media guidance data segment (e.g., the navigational link to segment identifier 124) based on this user input. For example, if the media guidance application is displaying a first set of comedy titles (e.g., as in display 100), and the user wishes to view one or more additional comedy titles, the viewer may press the DOWN arrow to view additional comedy titles that the media guidance application is not presently displaying (e.g., the titles in display 126).

In some embodiments, determining which navigational link to read involves comparing, for each of the plurality of navigational links, the navigation direction of the first user input to a direction associated with the navigational link, and selecting the navigational link with the associated direction that matches the navigation direction of the first user input. For example, if the first media guidance data segment includes navigational links "UP," "DOWN," "LEFT," and "RIGHT," the media guidance application may compare the navigation direction of the first user input to the directions associated with each navigational link. For example, if the navigation direction of the first user input is "DOWN," the media guidance application compares this direction with the directions associated with the "UP," "DOWN," "LEFT," and "RIGHT" navigational links (e.g., as shown as headings in table 118) to select the navigational link associated with the direction "DOWN," which matches the navigation direction of the first user input.

The media guidance application may read the contents of the navigational link corresponding to the navigation direction of the first user input. For example, if the navigation direction is "DOWN", the media guidance application may read the contents of the DOWN navigational link (e.g., segment identifier 124) in the media guidance data segment. The contents of the DOWN navigational link may be, for example, a pointer to a second media guidance data segment or an identifier of a second media guidance data segment containing an additional comedy title.

The media guidance application may determine, based on the contents of the navigational link corresponding to the navigation direction of the first user input, a second media guidance data segment for retrieval. The second media guidance data segment may include the media asset identifier (e.g., media asset identifiers 128) that is not generated for display (e.g., media asset identifiers 128 are not generated for display in display 100). For example, the media guidance application may determine, based on the contents of the DOWN navigational link (e.g., a pointer to a media guidance data segment), to retrieve the second media guidance data segment at the location given by the pointer. This second media guidance data segment includes the media asset identifier (e.g., "Frasier" in display 126) that was not already generated for display in display 100.

In some embodiments, the media asset identifiers of the first media guidance data segment and the second media guidance data segment are arranged in an ordered list. For example, the media asset identifiers shown in displays 100 and 126 may be in the following ordered list: "Big Bang Theory," "How I Met Your Mother," "Seinfeld," "Frasier," "Cheers," "The Simpsons." In such embodiments, the second media guidance data segment (e.g., the segment containing media asset identifiers 128) may contain media asset identifiers on the ordered list immediately below a first media asset identifier of the first media guidance data segment. For example, the media guidance application may receive a user input of "DOWN" using a remote control and the second media guidance data segment contains media asset identifiers (e.g., new media asset identifiers 128) that are ordered below the first media guidance data segment (e.g., still in classification group 108). As a specific example, the ordered list may be based on alphabetical order, such that a media guidance application generating for display media asset identifiers starting with the letter "H" in a "sports" category may, upon receiving an input of "UP" and the new segment being retrieved, generate for display media asset identifiers starting with the letter "G." Analogously, the second media guidance data segment linked may contain media asset identifiers on the ordered list immediately below a last media asset identifier of the first media guidance data segment. For example, the media guidance application may receive a user input of "DOWN" using a remote control, and the second media guidance data segment contains media asset identifiers (e.g., new media asset identifiers 128) that are ordered below the first media guidance data segment (e.g., still in classification group 108). As a specific example, the ordered list may be based on alphabetical order, such that a media guidance application generating for display media asset identifiers starting with the letter "G" in a "sports" category may, upon receiving an input of "DOWN" and the new segment being retrieved, generate for display media asset identifiers starting with the letter "H."

As another example, the second media guidance data segment may contain an initial media asset identifier on the ordered list if the first media guidance data segment contains a last media asset identifier on the ordered list. For example, if no further segments are below the currently displayed segment (e.g., media asset identifiers starting with the letter "Z" if ordered alphabetically), the media guidance application may, in response to a received user input of "DOWN," retrieve a segment corresponding to the first segment of the classification group or category (e.g., media asset identifiers starting with the letter "A" if ordered alphabetically). As yet another example, the second media guidance data segment may contain the last media asset identifier on the ordered list if the first media guidance data segment contains the initial media asset identifier on the ordered list. For example, if no further segments are above the currently displayed segment (e.g., media asset identifiers starting with the letter "A" if ordered alphabetically), the media guidance application, in response to a received user input of "UP," may retrieve a segment corresponding to the last segment of the classification group (e.g., media asset identifiers starting with the letter "Z" if ordered alphabetically).

As another example, the second media guidance data segment may contain a subcategory of media asset identifiers related to a media asset identifier of the first media guidance data segment. As described above, the media guidance application may receive a user selection of a media asset identifier for a series (e.g., media asset identifier 114) and retrieve a segment containing media asset identifiers of episodes (e.g., the subcategory) of the series. The media guidance data segment may include, for each media asset identifier for which a subcategory is available, a pointer or segment identifier for identifying or navigating to the media guidance data segment of the subcategory. A media guidance data segment for a subcategory may be linked to additional media guidance data segments for, e.g., additional media asset identifiers within the subcategory (e.g., additional episodes) or media asset identifiers associated with different subcategories.

In some embodiments, the first media guidance data segment corresponds to a first category. For example, the first media guidance data segment may correspond to the category "comedy" 108. In some embodiments, the media guidance application may retrieve a third segment of media guidance data comprising a plurality of categories of media assets (e.g., categories 102, 104, and 106) and generate for display the categories of media assets of the third segment of media guidance data. For example, the media guidance application may retrieve a third segment of media guidance data that includes other categories, such as "drama," "sports," and "movies" (categories 102, 104, and 106) and generate for display these additional categories, as shown in display 100. The media guidance application may display the categories so that a user may navigate to a different category, in which case the media guidance application would retrieve a media guidance data segment containing media asset identifiers within the selected category. In other embodiments, the first media guidance data segment may contain one or more additional categories, without including media asset identifiers within these additional categories. In such embodiments, the media guidance application may display the additional categories without media asset identifiers, and the additional categories can be selected by a user to cause the media guidance application to retrieve a media guidance data segment corresponding to the selected category.

In some embodiments, the first media guidance data segment corresponds to a first category, and the second media guidance data segment corresponds to a second category. For example, the first media guidance data segment may correspond to the "comedy" category, and the second media guidance data segment may correspond to the "drama" category. In response to the first user input, the media guidance application has displayed media asset identifiers in the "drama" category. The media guidance application, while generating for display the media asset identifiers of the second media guidance data segment, may receive a second user input corresponding to a navigation direction for navigating to a media asset identifier in the first category. For example, the media guidance application may receive a user input of "LEFT" or "RIGHT" (e.g., via a user input interface such as a remote control), which may correspond to retrieving a new segment containing media asset identifiers in the classification group to the left or right of the currently selected classification group (e.g., for classification group 106 if a "LEFT" command was received while classification group 108 is selected). For example, in situations where the media guidance application displays media asset identifiers of only one of the classification groups or categories at a time (e.g., classification group 108), the media guidance application may retrieve a segment (e.g., based on a segment identifier or pointer, as described above) with media asset identifiers for the classification group to the left or right of the previously selected classification group or category. In such embodiments, when navigating away from a classification group (e.g., to classification group 106), the media guidance application stores an indication of which segment was last generated for display. When returning to the first category, the media guidance application may generate for display the media asset identifiers of the first media guidance data segment, i.e., the media guidance data segment that the user had previously navigated away from. For example, if the media guidance application receives a series of user selections from classification group 102 to classification group 104 and back to classification group 102, instead of generating the first segment of media asset identifiers for classification group 102, the media guidance application may generate the segment that was last generated for display.

In some embodiments, prior to receiving the first user input for navigating to the media asset identifiers of the second media guidance data segment, the media guidance application visually distinguishes a first media asset identifier of the first media guidance data segment. For example, in display 100, the media guidance application uses highlight 116 to visually distinguish media asset identifier 114. After receiving the second user input for navigating back to the media asset identifiers of the first category, the media guidance application may visually distinguish the first media asset identifier of the first media guidance data segment (i.e., the same media asset identifier that was previously visually distinguished). For example, if the media guidance application navigates to the "drama" category and then returns back to the "comedy" category, the media guidance application may again highlight "Seinfeld" (e.g., media asset identifier 114) so that the user may continue navigating from the same media asset identifier that he left off on in the comedy category. To implement this, the media guidance application may store in memory data indicating that media asset identifier 114 had been selected in the comedy category when the user had navigated away.

In some embodiments, a segment may contain multiple classification groups and media asset identifiers within multiple classification groups. For example, a segment may include media asset identifiers in both a "comedy" classification group and a "drama" classification group. The media guidance application may permit a user to navigate within both classification groups, and if a user requests information outside of the displayed media asset identifiers (e.g., media asset identifiers of a third classification group, such as sports, or additional media asset identifiers of a currently displayed classification group), the media guidance application may retrieve another segment.

In some embodiments, multiple sets of media guidance data segments are available for retrieval, and each set of media guidance data segments includes media guidance data segments of a different size. For example, a first set of media guidance data segments may include media guidance data segments, each containing eight media asset identifiers, and a second set of media guidance data segments may include media guidance data segments, each containing 10 media asset identifiers. The media guidance application may select a set of media guidance data segments for retrieval based on a display characteristic, such as a screen size, resolution, or other display setting. For example, the media guidance application may retrieve data describing the different available sets of media guidance data segments, select one of the sets, and retrieve only media guidance data segments from the selected set.

The media guidance application may retrieve the second other media guidance data segment. For example, as described above, the media guidance application may retrieve the second media guidance data segment (e.g., identified by segment identifier 124) by transmitting a request for the segment to a media guidance data source (e.g., a remote server) or retrieve the linked segment from memory if it has already been received. The media guidance application may determine the second media guidance data segment to retrieve based on pointers contained in the first segment. For example, the first segment may contain a table (e.g., table 118) defining segment identifiers that are adjacent to the first segment. As described above, specific identifiers or pointers to locations in memory (e.g., at a remote server) containing a linked segment allow the media guidance application to quickly retrieve a new segment in response to a user command that provides media asset identifiers contiguous (e.g., a next set of alphabetically ordered identifiers) with media asset identifiers in the first segment.

The media guidance application may then generate for display the media asset identifiers of the second media guidance data segment. For example, the media guidance application may generate for display the media asset identifiers (e.g., titles) contained in the linked segment (e.g., display 126). In some embodiments, as described above, the media guidance application may retrieve media guidance data segments identified in the linked segment (e.g., for segment identifier 124) for more efficient navigation between segments.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
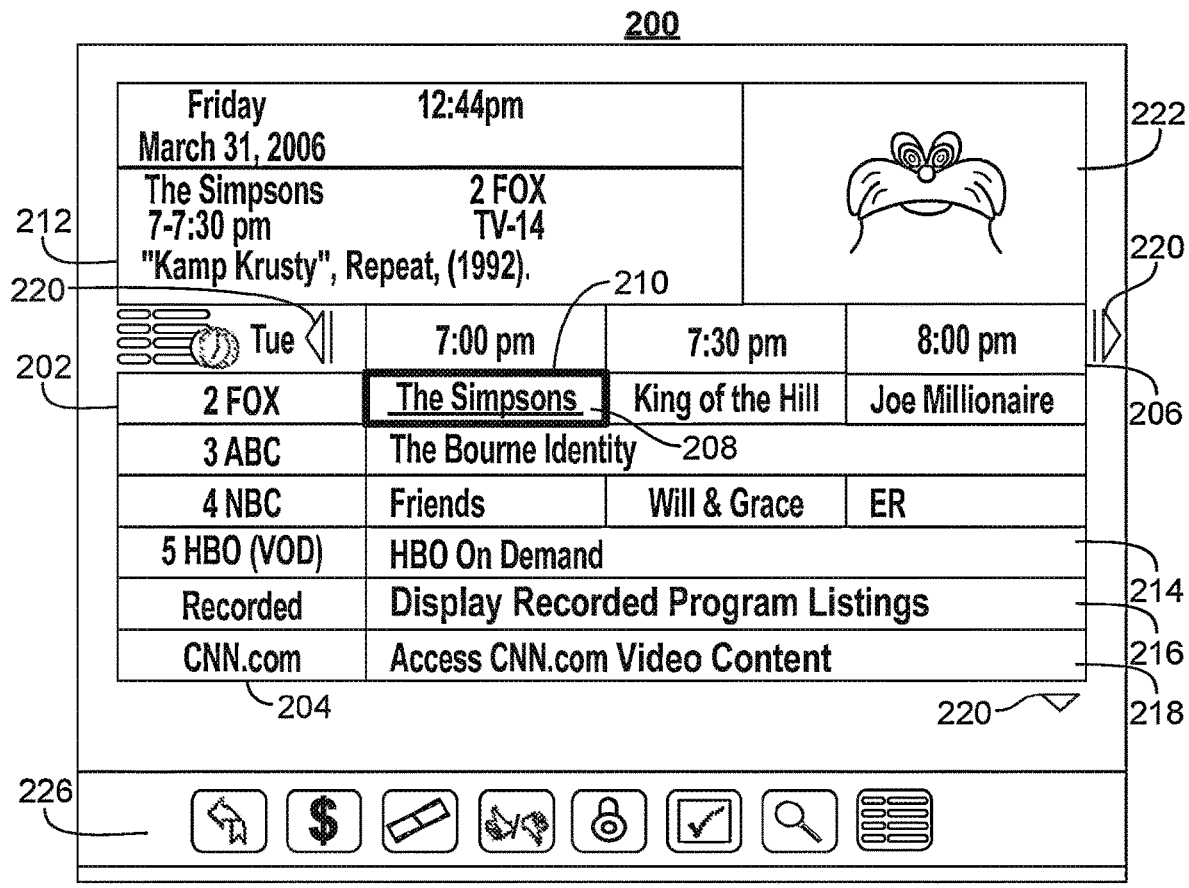
FIG. 2 shows another illustrative example of a display screen for use in accessing media content, in accordance with some embodiments of the disclosure.
Figure 3:
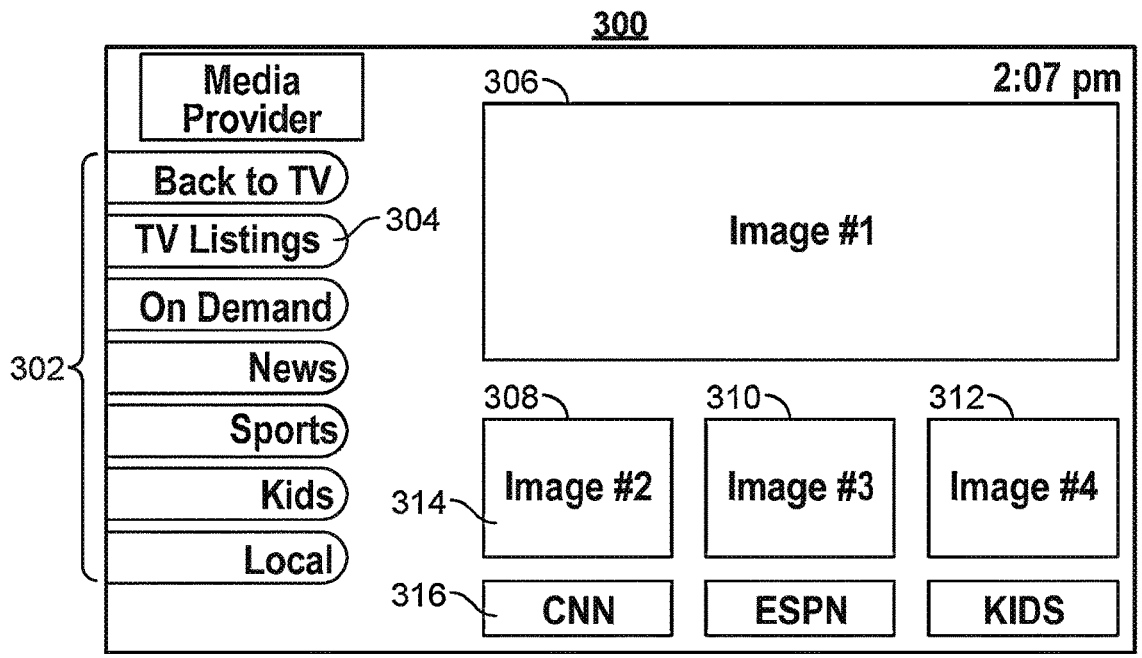
FIG. 3 shows yet another illustrative example of a display screen for use in accessing media content, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows an illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
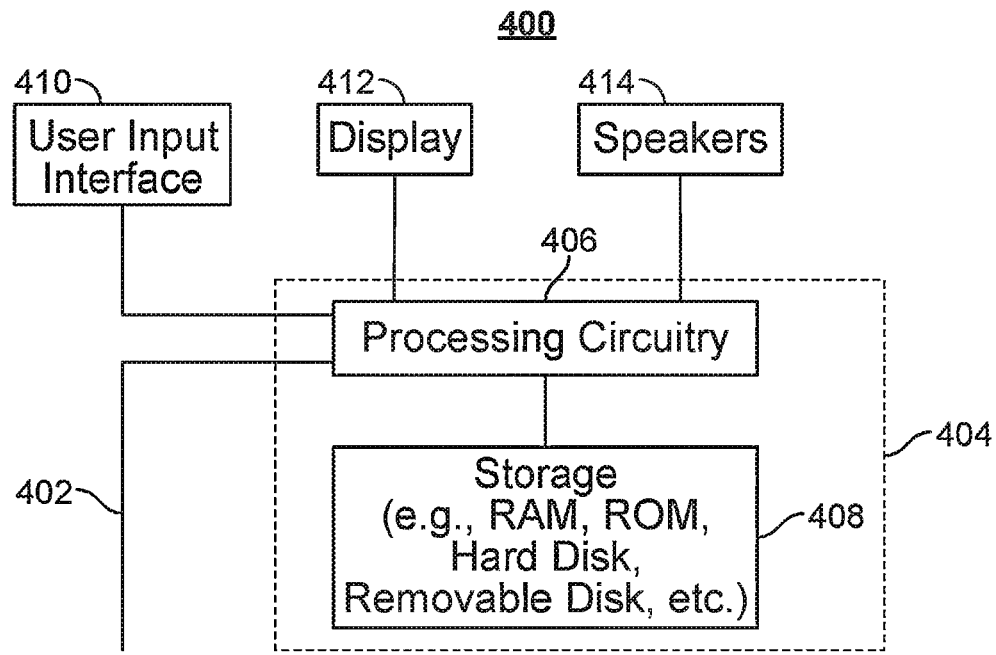
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
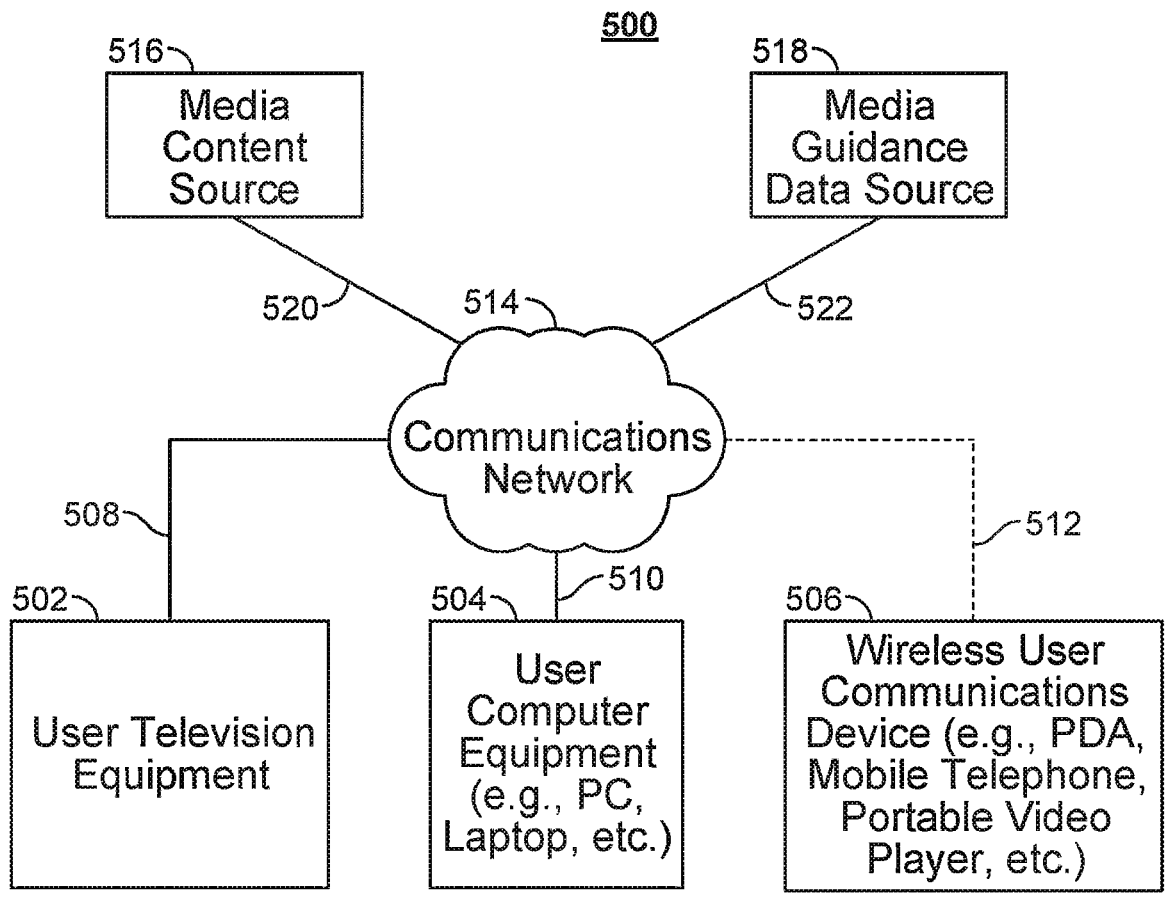
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
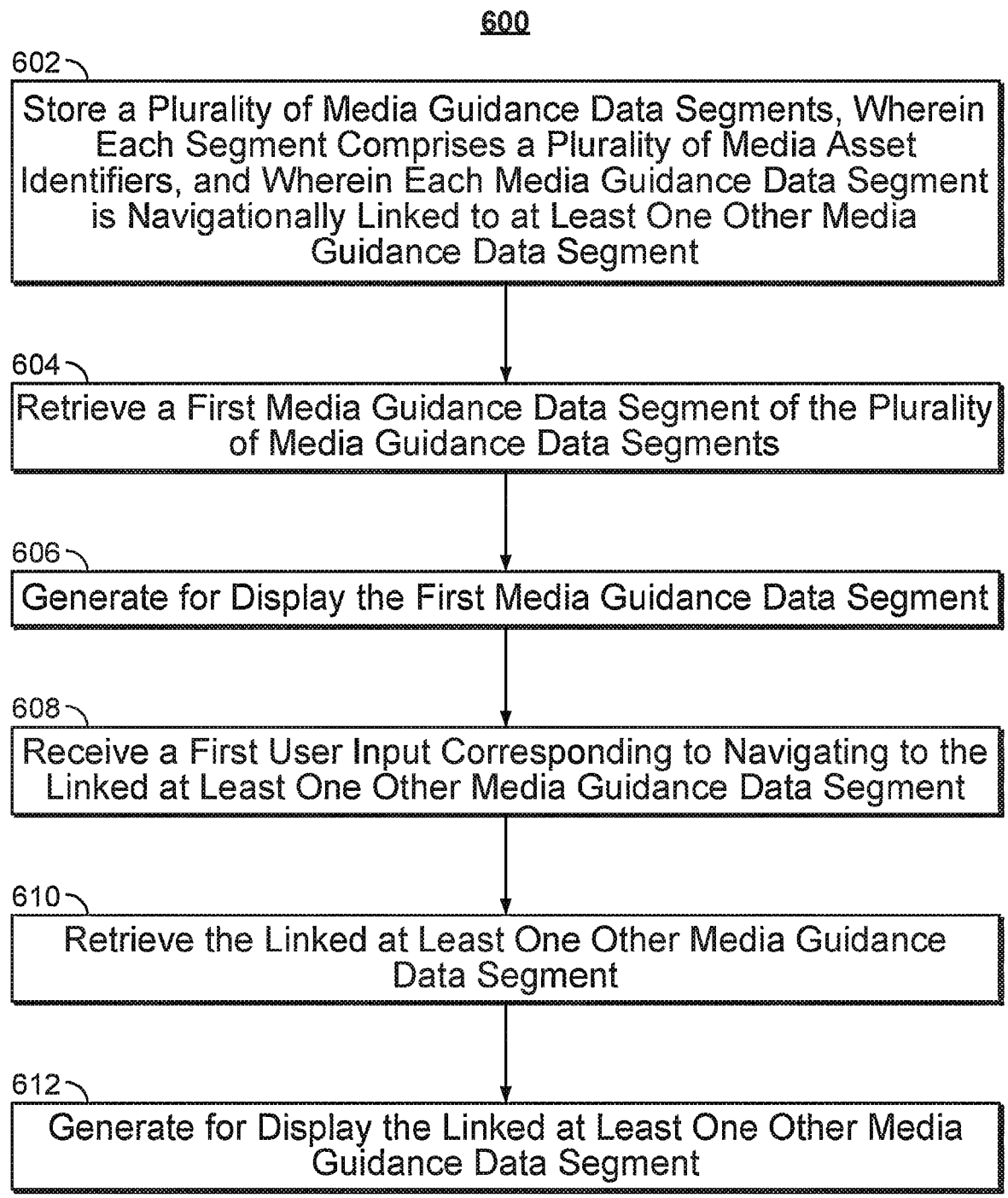
FIG. 6 is a flowchart of illustrative steps for navigating between segments of media guidance data, in accordance with some embodiments of the disclosure.

FIG. 6 is a flowchart of illustrative steps for navigating between segments of media guidance data, in accordance with some embodiments of the disclosure. For example, a media guidance application implementing process 600 may be executed by control circuitry 404 (FIG. 4) to efficiently navigate between segments of media guidance data.

Process 600 begins at 602, where the media guidance application stores (e.g., via control circuitry 404) a plurality of media guidance data segments. Each segment includes a plurality of media asset identifiers, and each media guidance data segment is navigationally linked to at least one other media guidance data segment. For example, media guidance data may be segmented (e.g., at media guidance data source 518) based on the amount of media asset identifiers that fit a display screen (e.g., display 412). As a specific example, the media guidance data may be segmented such that each segment includes four classification groups of media assets and five media asset identifiers (e.g., a title or box art associated with a media asset) below each classification group (e.g., a genre). Some or all of the segments may be stored locally in memory of the client-device (e.g., storage 408) and/or remotely at a remote server (e.g., media guidance data source 518 accessible via communications network 514). For example, the media guidance application may retrieve (e.g., via control circuitry 404) and store (e.g., in storage 408) segments that are linked to a first segment requested by a user from the media guidance data source in order to provide efficient navigation between segments. Once a new segment is requested, the media guidance application may retrieve (e.g., via control circuitry 404) a new set of segments that are adjacent to the new segment (e.g., a pointer to each of the new set of segments is stored in the new segment).

In some embodiments, the media guidance data may be segmented such that some classification groups do not contain any media asset identifiers. For example, these classification groups may be generated for display (e.g., on display 412) as part of a segment to both fill the screen and inform the user of classification groups other than the classification group that is currently selected (e.g., which contains media asset identifiers). In this situation, by the media guidance application not generating for display media asset identifiers in every category, more memory is available for the media guidance application to generate for display media asset identifiers in the currently selected category.

Process 600 continues to 604, where the media guidance application retrieves (e.g., via control circuitry 404) a first media guidance data segment of the plurality of media guidance data segments. For example, upon entering a display of media guidance data, the media guidance application may retrieve (e.g., via control circuitry 404) a first segment to generate for display (e.g., on display 412). The media guidance application may identify (e.g., via control circuitry 404) the first segment based on a default first segment (e.g., to always present video-on-demand listings for "comedies" upon a user entering a video-on-demand screen) or based on historical user interactions (e.g., the user typically selects video-on-demand programs that are "sports" programs, thus this classification group is part of the first segment).

Process 600 continues to 606, where the media guidance application generates (e.g., via control circuitry 404) for display the first media guidance data segment. For example, upon retrieving the first segment, the media guidance application may generate (e.g., via control circuitry 404) the segment for display (e.g., on display 412) such that a user can navigate the media asset identifiers of the first segment. In some embodiments, upon generating for display the first segment, the media guidance application determines (e.g., via control circuitry 404) a subset of media guidance data segments linked to the first media guidance data segment. For example, the first segment may have an identifier "000x01" and contain pointers to segments with identifiers "001x01" and "000x02" based respectively on a user request to move to a classification group to the right of the first segment or to a media asset identifier below the last media asset identifier contained on the segment. The media guidance application may then retrieve (e.g., via control circuitry 404) the subset of media guidance data segments. For example, the media guidance application may, if they have not been retrieved and stored locally already, transmit (e.g., via control circuitry 404) a request to a server (e.g., media guidance data source 518 via communication network 514) for the segments based on their identifiers.

Process 600 continues to 608, where the media guidance application receives (e.g., via control circuitry 404) a first user input corresponding to navigating to the linked at least one other media guidance data segment. For example, the media guidance application may receive (e.g., via control circuitry 404) a variety of user inputs, such as to navigate between classification groups of media assets, navigate inside a classification group to a different segment of media asset identifiers, or navigate to a new classification group based on a two-level hierarchical structure (e.g., a media asset identifier is for a series and selection by a user follows a pointer to another segment containing episodes of the series), as described above with respect to FIG. 1. In order to determine that a new segment should be displayed, the media guidance application may determine (e.g., via control circuitry 404) from data in the first segment identifiers of segments, or pointers to locations in memory (e.g., storage 408) of segments, associated with a particular user command. For example, the media guidance application may determine (e.g., via control circuitry 404) that selection of a particular media asset listing corresponds to a request for episodes of a series and will retrieve (e.g., via control circuitry 404) the appropriate segment containing the episodes to generate for display (e.g., on display 412) to the user.

Process 600 continues to 610, where the media guidance application retrieves (e.g., via control circuitry 404) the linked at least one other media guidance data segment. For example, as described above with respect to FIG. 1 and step 604, the media guidance application may retrieve (e.g., via control circuitry 404) the linked segment by transmitting a request for the segment to a media guidance data source (e.g., a remote server) or retrieve (e.g., via control circuitry 404) the linked segment from memory (e.g., storage 408) if it has already been received.

Process 600 continues to 612, where the media guidance application generates (e.g., via control circuitry 404) for display the linked at least one other media guidance data segment. For example, the media guidance application may generate (e.g., via control circuitry 404) for display (e.g., on display 412) the media asset identifiers and classification groups contained in the linked segment. In some embodiments, as described above, the media guidance application may retrieve (e.g., via control circuitry 404) media guidance data segments identified in the linked segment (e.g., by segment identifiers) for more efficient navigation between segments.

Figure 7:
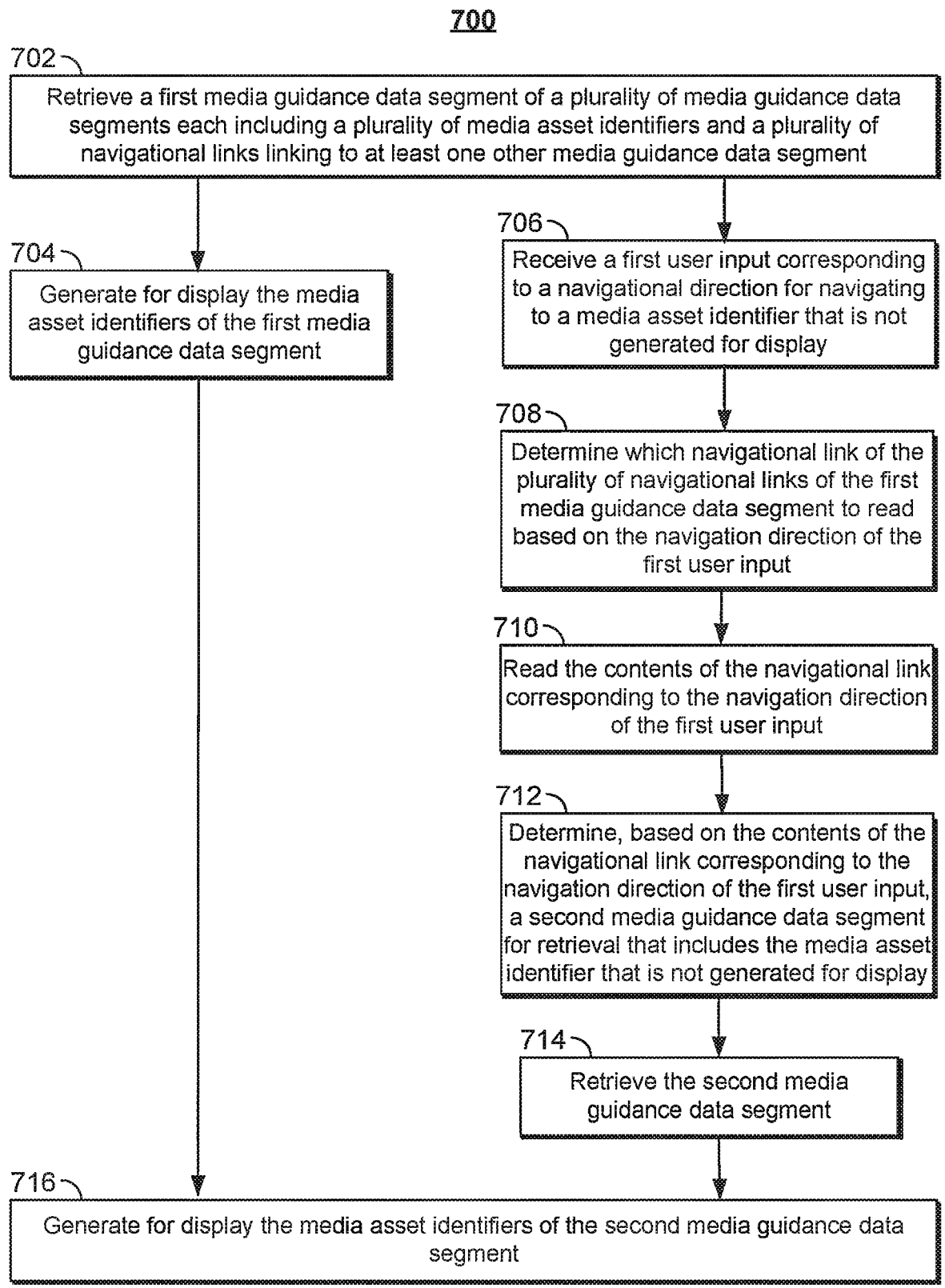
FIG. 7 is a flowchart of illustrative steps for navigating between segments of media guidance data, in accordance with some embodiments of the disclosure.

FIG. 7 is a flowchart of illustrative steps for navigating between segments of media guidance data, in accordance with some embodiments of the disclosure. For example, a media guidance application implementing process 700 may be executed by control circuitry 404 (FIG. 4) to efficiently navigate between segments of media guidance data.

At 702, control circuitry 404 retrieves a first media guidance data segment of a plurality of media guidance data segments, each including a plurality of media asset identifiers and a plurality of navigational links linking to at least one other media guidance data segment. For example, a particular on-demand channel (e.g., the HBO channel) may have its media asset identifiers divided into multiple linked segments, as described above with respect to FIG. 1. This on-demand channel may have a default media guidance data segment, such as the first ten listings in the "comedy" category (e.g., the ten most recent comedies, or the first ten comedies in alphabetical order), that is displayed first. Control circuitry 404 may retrieve the media guidance data segment (e.g., by requesting the default segment, or by requesting a particular segment known to the control circuitry 404 to be the default segment).

At 704, control circuitry 404 generates for display the media asset identifiers of the first media guidance data segment. For example, if control circuitry 404 has retrieved the segment containing the first ten media asset identifiers in the "comedy" category, control circuitry 404 will generate for display these ten media asset identifiers. In some embodiments, control circuitry 404 will also generate for display on or more additional classification groups or categories (e.g., "drama", "sports") without displaying media asset identifiers for these classification groups. This way, the user is aware that additional classification groups are available and may be selected. These media asset identifiers may be displayed on display 412.

While the media asset identifiers are generated for display at 704, at 706, control circuitry 404 receives a first user input corresponding to a navigational direction for navigating to a media asset identifier that is not generated for display. The first user input may be user input interface 410. As discussed with respect to FIG. 1, the control circuitry 404 may receive a remote control command, such as DOWN, UP, LEFT, RIGHT, SELECT, or BACK. Such commands correspond to navigational directions and are used by the user to navigate to media asset identifiers that are not presently displayed (e.g., media asset identifiers that do not fit the portion of the screen dedicated to displaying the current segment, or that are in other categories, or that are at different levels of a hierarchical structure (e.g., different levels for series, seasons of a series, and episodes within a season)). As discussed with respect to FIG. 8, control circuitry 404 may determine whether the media asset identifier to which the user wants to navigate is or is not currently generated for display. Control circuitry 404 may proceed to the following step only after it determines that the requested media asset identifier is not currently generated for display.

At 708, while the media asset identifiers are still generated for display at 704, control circuitry 404 determines which navigational link of the plurality of navigational links of the first media guidance data segment to read based on the navigation direction of the first user input. For example, control circuitry 708 may compare the direction of the first user input to the directions corresponding to navigational links of the first media guidance data segment (e.g., the directions Up and Down in table 118) to determine which navigational link of the media guidance data segment to read. For example, if media guidance application receives a first user input of a keypress of the "DOWN" arrow from user input interface 410, the media guidance application may determine that the "DOWN" navigational direction of the first user input corresponds to navigational link 124 of table 118.

At 710, while the media asset identifiers are still generated for display at 704, control circuitry 404 reads the contents of the navigational link corresponding to the navigation direction of the first user input. In this example, having determined to read navigational link 124 of table 118 based on the "DOWN" navigational direction of the user input, control circuitry 404 reads navigational link 124, which contains the segment identifier 001_01.

At 712, while the media asset identifiers are still generated for display at 704, control circuitry 404 determines, based on the contents of the navigational link corresponding to the navigation direction of the first user input, a second media guidance data segment for retrieval that includes the media asset identifier that is not generated for display. In this example, control circuitry 404 determines that it should retrieve the media guidance data segment at segment identifier 001_01. This media guidance data segment will include media asset identifiers below the ten comedy media asset identifiers currently displayed (e.g., identifiers for the ten next-most recent media assets, or the ten next comedies in alphabetical order).

At 714, while the media asset identifiers are still generated for display at 704, control circuitry 404 retrieves the second media guidance data segment. For example, if control circuitry 404 had already retrieved and stored one or more media guidance data segments that the first media guidance data segment linked to, as described with respect to FIG. 1, control circuitry 404 can retrieve the second media guidance data segment from local storage (e.g., storage 408). Alternatively, if the second media guidance data segment had not been pre-stored, control circuitry 404 may retrieve the second media guidance data segment from a server (e.g., media guidance data source 518) using the segment identifier (in this case, 001_01).

At 716, control circuitry 404 generates for display the media asset identifiers of the second media guidance data segment. These media asset identifiers replace the media asset identifiers that were generated for display at 704. In this example, control circuitry 404 generates for display the media asset identifiers (e.g., identifiers for the next ten comedies) of segment 001_01. These media asset identifiers may be displayed on display 412.

Figure 8:
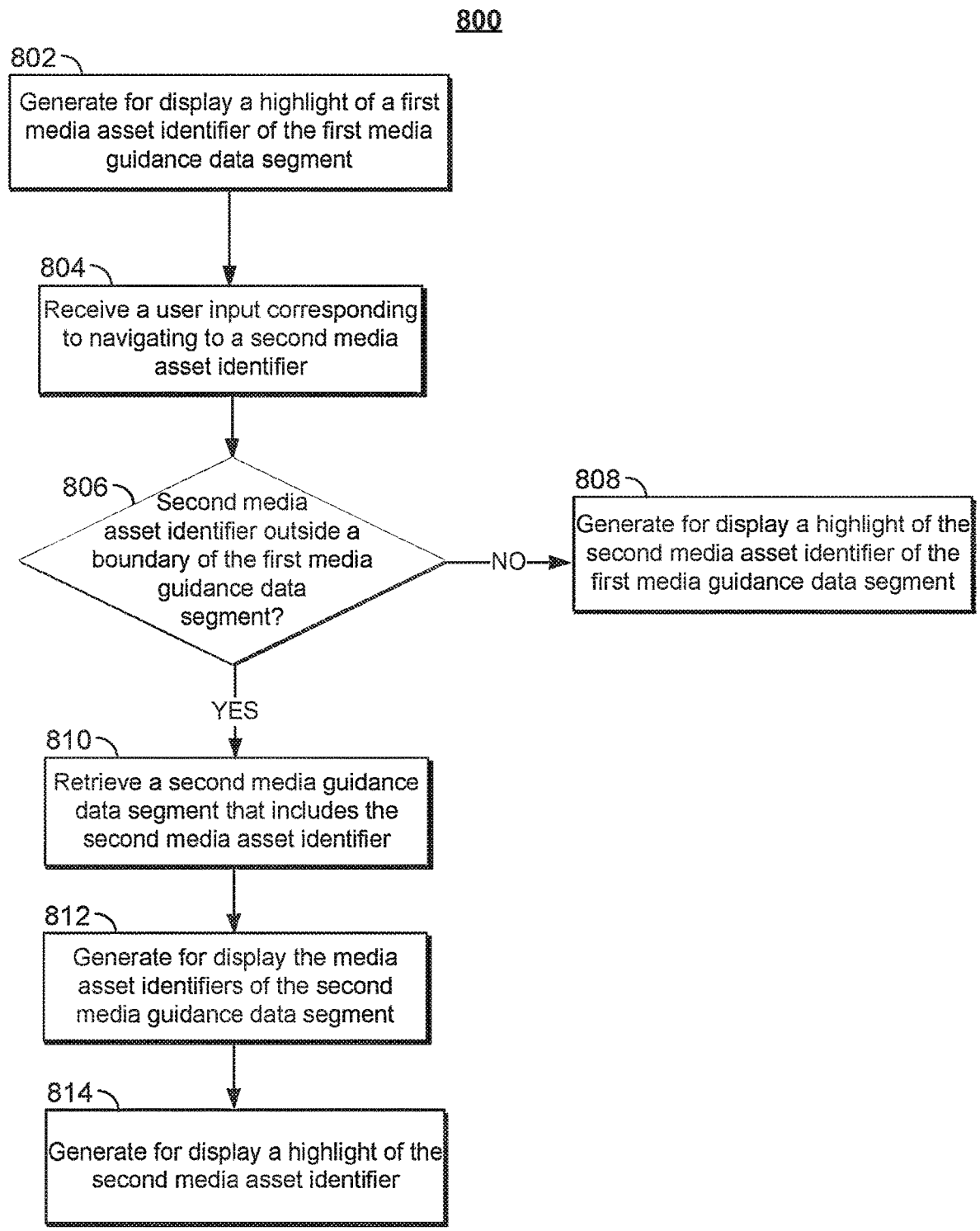
FIG. 8 is a flowchart of illustrative steps for navigating within a segment of media guidance data, in accordance with some embodiments of the disclosure.

FIG. 8 is a flowchart of illustrative steps for navigating within a segment of media guidance data, in accordance with some embodiments of the disclosure. For example, a media guidance application implementing process 800 may be executed by control circuitry 404 (FIG. 4) to efficiently navigate between segments of media guidance data.

At 802, control circuitry 404 generates for display a highlight of a first media asset identifier of the first media guidance data segment. The highlight, along with the media asset identifiers of the first media guidance data segment, may be displayed on display 412. For example, as shown in display 100, media asset identifier 114 ("Seinfeld") is visually distinguished by highlight 116.

At 804, control circuitry 404 receives a user input corresponding to navigating to a second media asset identifier. For example, as described with respect to FIGS. 1 and 7, control circuitry 404 may receive a navigational input (e.g., DOWN, UP, LEFT, RIGHT, SELECT, or BACK) via user input interface 410. This navigational input may correspond to moving around the currently displayed media asset identifiers, or moving to off-screen media asset identifiers.

At 806, control circuitry 404 determines whether the second media asset identifier is outside a boundary of the first media guidance data segment. For example, in a hierarchical structure in which only identifiers of series, identifiers of seasons, or identifiers of episodes are displayed, a SELECT or BACK input will typically lead to media asset identifiers that are outside a boundary of the first media guidance data segment. As a particular example, if the media asset identifier for the series "Seinfeld" (e.g., media asset identifier 114) is highlighted and the control circuitry 404 receives a SELECT input, the next level of media asset identifiers (e.g., seasons of "Seinfeld," or individual episodes of "Seinfeld") are not within the boundary of the current media guidance data segment, which only displays series titles.

As another example, if control circuitry 404 receives a direction such as UP, DOWN, LEFT, or RIGHT, control circuitry 404 may consider the current highlight location (in display 100, at the bottom of the screen) and determine whether the highlight can move any farther in the selected direction. For example, in display 100, the highlight can move to a higher media asset identifier (e.g., media asset identifier 112), so the second media asset identifier is not outside a boundary of the first media guidance data segment, but the highlight cannot move to a lower media asset identifier, because none is available on-screen. Alternatively, control circuitry 404 may consider the selected location within the current media guidance data segment, and determine whether any additional data is available in the selected direction.

At 808, if control circuitry 404 determines that the second media asset identifier is not outside a boundary of the first media guidance data segment (e.g., if control circuitry displaying display 100 receives an "UP" command, and the next-higher media asset identifier 112 is within the boundary of the media guidance data segment), control circuitry 404 generates for display a highlight of the second media asset identifier of the first media guidance data segment. For example, from display 100, control circuitry 404, after receiving an "UP" user input, would display a highlight of media asset identifier 112 for "How I Met Your Mother."

At 810, if control circuitry 404 determines that the second media asset identifier is outside a boundary of the first media guidance data segment (e.g., if control circuitry displaying display 100 receives a "DOWN" command, and the media asset identifier below "Seinfeld" is outside the boundary of the media guidance data segment), control circuitry 404 retrieves a second media guidance data segment that includes the second media asset identifier. Control circuitry 404 may perform steps 708, 710, 712, and 714, described with respect to FIG. 7, to retrieve the second media guidance data segment.

At 812, control circuitry 404 generates for display the media asset identifiers of the second media guidance data segment. This may be performed in a similar manner to step 716 of FIG. 7.

At 814, control circuitry 404 generates for display a highlight of the second media asset identifier. The highlight may be generated in a similar manner to step 802.

It is contemplated that the steps or descriptions of FIGS. 6, 7, and 8 may be used with any other embodiment of this disclosure. In addition, the steps and descriptions described in relation to FIGS. 6, 7, and 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one or more of the steps in FIGS. 6, 7, and 8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
retrieving user activity information associated with each media asset identifier of a plurality of media asset identifiers of a media asset category, wherein the user activity information is associated with a user profile;
based at least in part on the user activity information, determining that selection of media asset identifier of the plurality of media asset identifiers was previously received from a user of the user profile, wherein the selection was received at a first time;
at a second time after the first time, receiving an input from the user to navigate to the media asset category; and
generating for display the plurality of media asset identifiers, at least in part by:
based at least in part on the determining that the selection of the media asset identifier was received at the first time and the receiving of the input from the user to navigate to the media asset category at the second later time:
causing the display of the plurality of media asset identifiers to include highlighting of the previously selected media asset identifier of the plurality of media asset identifiers, wherein the highlighting causes navigation through the plurality of displayed media asset identifiers to start from the highlighted media asset identifier, and wherein a first side of the highlighted media asset identifier is adjacent to a first media asset identifier of the plurality of media asset identifiers of the media asset category, and a second side of the highlighted media asset identifier is adjacent to a second media asset identifier of the plurality of media asset identifiers.

2. The method of claim 1, further comprising:
generating for simultaneous display with the highlighted media asset identifier a preview of a media asset represented by the highlighted media asset identifier.

3. The method of claim 1, further comprising:
generating for simultaneous display with the highlighted media asset identifier a description of a media asset represented by the highlighted media asset identifier.

4. The method of claim 1, wherein receiving the first user input to navigate to the first media asset category comprises:
receiving an indication to navigate from a second media asset category to the first media asset category.

5. The method of claim 4, further comprising:
in response to receiving the first user input to navigate to the first media asset category, causing the plurality of media asset identifiers of the first media asset category to be generated for display and ceasing the generating for display of a plurality of media asset identifiers of the second media asset category.

6. The method of claim 1, further comprising:
receiving user input to navigate through the plurality of media asset identifiers of the first media asset category generated for display;
while the plurality of media asset identifiers of the first media asset category are being generated for display, refraining from generating for display a plurality of media asset identifiers from other media asset categories.

7. The method of claim 1, wherein the user activity information comprises viewer data and subscription data.

8. The method of claim 7, further comprising:
calculating viewer patterns based on the user activity information to determine a likelihood that a user associated with the user activity information will terminate access to a subscription.

9. The method of claim 1, wherein:
the first media asset category is an ordered list of the plurality of media asset identifiers; and
a default arrangement of the ordered list comprises an initial media asset identifier being displayed above the highlighted media asset identifier.

10. The method of claim 1, wherein video of a media asset corresponding to the highlighted media asset identifier is not being output while the plurality of media asset identifiers are being generated for display.

11. The method of claim 1, wherein the first media asset category having the highlighted media asset identifier is generated for display without generating for output any of the media assets corresponding to the plurality of media asset identifiers of the first media asset category.

12. A system comprising:
control circuitry configured to:
retrieve user activity information associated with each media asset identifier of the plurality of media asset identifiers of a media asset category, wherein the user activity information is associated with a user profile;
based at least in part on the user activity information, determine that selection of media asset identifier of the plurality of media asset identifiers was previously received from a user of the user profile, wherein the selection was received at a first time;
input/output circuitry configured to:
at a second time after the first time, receive an input from the user to navigate to the media asset category; and
wherein the control circuitry is further configured to:
generate for display the plurality of media asset identifiers, at least in part by:
based at least in part on the determining that the selection of the media asset identifier was received at the first time and the receiving of the input from the user to navigate to the media asset category at the second later time:
cause the display of the plurality of media assets identifiers to include highlighting of the previously selected media asset identifier of the plurality of media asset identifiers, wherein the highlighting causes navigation through the plurality of media asset identifiers to start from the highlighted media asset identifier, and wherein a first side of the highlighted media asset identifier is adjacent to a first media asset identifier of the plurality of media asset identifiers of the media asset category, and a second side of the highlighted media asset identifier is adjacent to a second media asset identifier of the plurality of media asset identifiers.

13. The system of claim 12, wherein the control circuitry is further configured to:
generate for simultaneous display with the highlighted media asset identifier a preview of a media asset represented by the highlighted media asset identifier.

14. The system of claim 12, wherein the control circuitry is further configured to:
generate for simultaneous display with the highlighted media asset identifier a description of a media asset represented by the highlighted media asset identifier.

15. The system of claim 12, wherein the input/output circuitry is configured to receive the first user input to navigate to the first media asset category by:
receiving an indication to navigate from a second media asset category to the first media asset category.

16. The system of claim 15, wherein the control circuitry is further configured to:
in response to receiving the first user input to navigate to the first media asset category, cause the plurality of media asset identifiers of the first media asset category to be generated for display and cease the generating for display of a plurality of media asset identifiers of the second media asset category.

17. The system of claim 12, wherein:
the input/output circuitry is further configured to:
receive user input to navigate through the plurality of media asset identifiers of the first media asset category generated for display; and
the control circuitry is further configured to:
while the plurality of media asset identifiers of the first media asset category generated for display, refrain from generating for display a plurality of media asset identifiers from other media asset categories.

18. The system of claim 12, the control circuitry is further configured to:
calculate viewer patterns based on the user activity information to determine a likelihood that a user associated with the user activity information will terminate access to a subscription.

19. The system of claim 12, wherein:
the first media asset category is an ordered list of the plurality of media asset identifiers; and
a default arrangement of the ordered list comprises an initial media asset identifier being displayed above the highlighted media asset identifier.

* * * * *